United States Patent
Shchur et al.

(10) Patent No.: US 10,956,604 B2
(45) Date of Patent: Mar. 23, 2021

(54) ELECTRONIC DEVICE AND OPERATION METHOD THEREOF

(71) Applicant: Samsung Electronics Co., Ltd., Suwon-si (KR)

(72) Inventors: Oleksandr Shchur, Kiyv (UA); Aleksandra Peteichuk, Tiachivskyi region (UA); Andriy Oliynyk, Kyiv (UA); Oleksandr Radomskyi, Kharkov (UA); Yevgen Yakishyn, Kiyv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 15/854,553

(22) Filed: Dec. 26, 2017

(65) Prior Publication Data

US 2018/0181772 A1   Jun. 28, 2018

(30) Foreign Application Priority Data

Dec. 26, 2016   (KR) .......................... 10-2016-0179311

(51) Int. Cl.
*G06F 21/62* (2013.01)
*G06K 9/00* (2006.01)
(Continued)

(52) U.S. Cl.
CPC ........ *G06F 21/6245* (2013.01); *G06F 21/316* (2013.01); *G06K 9/00335* (2013.01); *G06K 9/00342* (2013.01); *G06K 9/00362* (2013.01); *G06K 9/00771* (2013.01); *G06K 9/00885* (2013.01); *G06T 11/60* (2013.01); *G06K 2009/00953* (2013.01)

(58) Field of Classification Search
CPC ............. G06F 21/6245; G06F 21/316; G06K 9/00335; G06K 9/00342; G06K 9/00362; G06K 9/00771; G06K 9/00885; G06T 11/60
See application file for complete search history.

(56) References Cited

U.S. PATENT DOCUMENTS 7,120,607 B2   10/2006   Bolle et al.
8,934,737 B1 *  1/2015   Solliday-McRoy ........................ G06F 21/6254
382/305

(Continued)

FOREIGN PATENT DOCUMENTS

JP   2002259318 A   9/2002
KR   10-0826873 B1   5/2008
(Continued)

OTHER PUBLICATIONS

Gregory S. Nelson, Practical Implications of Sharing Data: A Primer on Data Privacy, Anonymization, and De-Identification, ThotWave Technologies (Year: 2015).*

(Continued)

*Primary Examiner* — Shanto Abedin

(57) ABSTRACT

An electronic device for de-identifying dynamic biometric data of a user and an operation method thereof are disclosed. The method includes the operations of obtaining dynamic biometric data regarding a movement of a user; de-identifying the dynamic biometric data by distorting the dynamic biometric data; and transmitting the de-identified dynamic biometric data to a server.

20 Claims, 13 Drawing Sheets

| TIME | RIGHT KNEE ANGLE | MODIFICATION VALUE | RIGHT KNEE ANGLE AFTER MODIFICATION |
|---|---|---|---|
| $t_1$ | 65 | +13 | 78 |
| $t_2$ | 82 | +5 | 87 |
| $t_3$ | 135 | -5 | 130 |
| $t_4$ | 120 | +3 | 123 |
| $t_5$ | 170 | +4 | 174 |
| $t_6$ | 165 | -1 | 164 |

(51) Int. Cl.
G06T 11/60 (2006.01)
G06F 21/31 (2013.01)

(56) References Cited

U.S. PATENT DOCUMENTS

| | | | |
|---|---|---|---|
| 9,007,473 B1* | 4/2015 | Worley, III | H04N 21/2347 348/211.11 |
| 9,106,789 B1 | 8/2015 | Shipman, Jr. et al. | |
| 9,799,096 B1* | 10/2017 | De la Torre | A63F 13/655 |
| 9,832,206 B2* | 11/2017 | Mare | H04L 63/08 |
| 10,679,749 B2* | 6/2020 | Baughman | G06F 21/316 |
| 2004/0019570 A1* | 1/2004 | Bolle | G06Q 20/3821 705/64 |
| 2008/0065900 A1* | 3/2008 | Lee | H04L 9/3231 713/186 |
| 2009/0287930 A1* | 11/2009 | Nagaraja | H04L 9/08 713/171 |
| 2010/0302138 A1 | 12/2010 | Poot et al. | |
| 2012/0320982 A1* | 12/2012 | Francois | H04N 19/51 375/240.16 |
| 2013/0259330 A1* | 10/2013 | Russo | G06K 9/00087 382/124 |
| 2014/0089673 A1* | 3/2014 | Luna | A61B 5/681 713/186 |
| 2014/0333524 A1* | 11/2014 | Liu | H04L 63/0861 345/156 |
| 2015/0128285 A1* | 5/2015 | LaFever | H04L 63/0407 726/26 |
| 2015/0235055 A1* | 8/2015 | An | G06F 21/32 713/186 |
| 2016/0050217 A1* | 2/2016 | Mare | H04L 63/08 726/4 |
| 2017/0092015 A1* | 3/2017 | McCann | G06T 19/20 |

FOREIGN PATENT DOCUMENTS

| KR | 10-1434899 B1 | 8/2014 |
|---|---|---|
| KR | 10-2016-0088158 A | 7/2016 |

OTHER PUBLICATIONS

Machine translation of Korean patent application No. 1020060086266, Electronics and Telecommunications Research Institute (Year: 2008).*
Simson L. Garfinkel, De-Identification of Personal Information, NISTIR 8053, National Institute of Standards and Technology . (Year: 2015).*
Branko Samarzija et al, An Approach to the De-Identification of Faces in Different Poses, MIPRO (Year: 2014).*
European Patent Office, "Supplementary European Search Report," Application No. EP17889173.5, dated Oct. 15, 2019, 9 pages.
Agrawal, Prachi, et al., "Person De-Identification in Videos," IEEE Transactions on Circuits and Systems for Video Technology, vol. 21, No. 3, Mar. 2011, 12 pages.
Blažević, Martin, et al., "Towards Reversible De-Identification in Video Sequences Using 3D Avatars and Steganography," Proceedings of the Croatian Computer Vision Workshop, Year 3, Zagreb, Croatia, Sep. 22, 2015, 6 pages.
Ribaric, Slobodan, et al., "De-identification for privacy protection in multimedia content: A survey," Signal Processing: Image Communication, vol. 47, Jun. 2016, 21 pages.
Xu, Wanxin, et al., "Affect-Preserving Privacy Protection of Video," IEEE International Conference on Image Processing (ICIP), dated Sep. 27, 2015, 5 pages.
Masquerade Technologies, Inc., "Live Filters for Selfie," 2015-2016, 1 page Retrieved from: http://msqrd.me/.
Whatsapp FAQs, "End-to-End Encryption," 2017, 4 pages. Retrieved from: https://whatsapp.com/faq/en/general/28030015.
Serwadda, Abdul, et al., "Toward Robotic Robbery on the Touch Screen," ACM Transactions on Information and System Security, vol. 18, No. 4, Article 14, May 2016, 25 pages. Retrieved from: http://dl.acm.org/citation.cfm?id=2898353&dl=ACM&coll=DL &CFID=614870110&CFTOKEN=53270490.
Wikipedia, "Gait analysis," Nov. 1, 2017, 7 pages. Retrieved from: https://en.wikipedia.org/wiki/Gait_analysis#Biometric_identification_ and_forensics.
Giles Jim, "Cameras know you by your walk," Technology News, Sep. 19, 2002, 2 pages. Retrieved from: https://www.newscientist.com/article/mg21528835-600-cameras-know-you-by-your-walk/.
Boyd, Jeffrey E., et al., "Biometric Gait Recognition," Biometrics School 2003, LNCS 3161, pp. 19-42, 2005, Springer-Verlag, Berlin Heidelberg, 24 pages. Retrieved from: http://pages.cpsc.uc.algary.ca/~boyd/papers/biometric-summerschool.pdf.
Ali, Saad, et al., "Chaotic Invariants for Human Action Recognition," IEEE International Conference on Computer Vision (ICCV), Rio de Janeiro, Brazil, Oct. 14-20, 2007, 4 pages. Retrieved from: http://www.cs.cmu.edu/afs/cs/Web/People/saada/Projects/ChaoticInvariants/index.html.
Facerig, "Real time facial animation," Dec. 26, 2017, 4 pages. Retrieved from: https://facerig.com.
ISA/KR, "International Search Report and Written Opinion of the International Search Authority," International Application No. PCT/KR2017/015419, dated Apr. 16, 2018, 11 pages.

* cited by examiner

| TIME | RIGHT KNEE ANGLE | MODIFICATION VALUE | RIGHT KNEE ANGLE AFTER MODIFICATION |
|---|---|---|---|
| $t_1$ | 65 | +13 | 78 |
| $t_2$ | 82 | +5 | 87 |
| $t_3$ | 135 | −5 | 130 |
| $t_4$ | 120 | +3 | 123 |
| $t_5$ | 170 | +4 | 174 |
| $t_6$ | 165 | −1 | 164 |

ELECTRONIC DEVICE AND OPERATION METHOD THEREOF

CROSS-REFERENCE TO RELATED APPLICATION AND CLAIM OF PRIORITY

This application is related to and claims priority to Korean Patent Application No. 10-2016-0179311, filed on Dec. 26, 2016, the contents of which are incorporated herein by reference.

TECHNICAL FIELD

The present disclosure relates to electronic devices and operation methods thereof, and more particularly, to electronic devices for de-identifying dynamic biometric data of a user and operation methods thereof.

BACKGROUND

Recently, as biometric technologies have evolved, various methods have been developed to identify biometrics of users. Also, services utilizing biometrics of users are also being developed. The biometrics of users may be divided into physiological biometrics such as fingerprint, hand, iris, face, DNA, and the like, and behavioral biometrics such as key stroke, signature, voice, gait, and the like.

If unique features of users are extracted from such biometrics, users may be identified using the features. For example, users may be identified through fingerprint recognition, iris recognition, and the like. In general, it is not easy to acquire physiological biometrics without the consent of users. However, dynamic biometrics such as movement of users, gait, etc., among biometrics related to behavior may be obtained without difficulty by observing users.

In particular, when a movement of a user is captured and displayed as an avatar in an open environment, since the movement of the user is directly exposed to the avatar, a movement of the avatar may be observed and then dynamic biometrics of the user may be obtained without regard to the user's intentions or permission.

Therefore, when the movement of the user is reconstructed and displayed in an open environment using the dynamic biometric data of the user, the biometrics of the user are exposed irrespective of the intention or permission of the user, which is a problem in terms of protection of personal information.

SUMMARY

To address the above-discussed deficiencies, it is a primary object to provide electronic devices for de-identifying dynamic biometric data of a user and operation methods thereof.

Additional aspects will be set forth in part in the description which follows and, in part, will be apparent from the description, or may be learned by practice of the presented embodiments.

According to certain embodiments of this disclosure, a method of operating an electronic device includes: obtaining dynamic biometric data regarding a movement of a user; de-identifying the dynamic biometric data by distorting the dynamic biometric data; and transmitting the de-identified dynamic biometric data to a server.

According to certain embodiments of this disclosure, an electronic device includes: a communicator; a memory configured to store a program for performing an operation of the electronic device; and a processor configured to execute the program to obtain dynamic biometric data regarding a movement of a user; de-identify the dynamic biometric data by distorting the dynamic biometric data; and transmit the de-identified dynamic biometric data to a server.

According to certain embodiments of this disclosure, a method of operating a server includes receiving dynamic biometric data regarding a movement of a user; de-identifying the dynamic biometric data by distorting the dynamic biometric data; and providing a service based on the de-identified dynamic biometric data.

According to certain embodiments of this disclosure, a server includes: a communicator; a memory configured to store a program for performing an operation of the server; and a processor configured to execute the program to obtain dynamic biometric data regarding a movement of a user, de-identify the dynamic biometric data by distorting the dynamic biometric data, and provide a service based on the de-identified dynamic biometric data.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
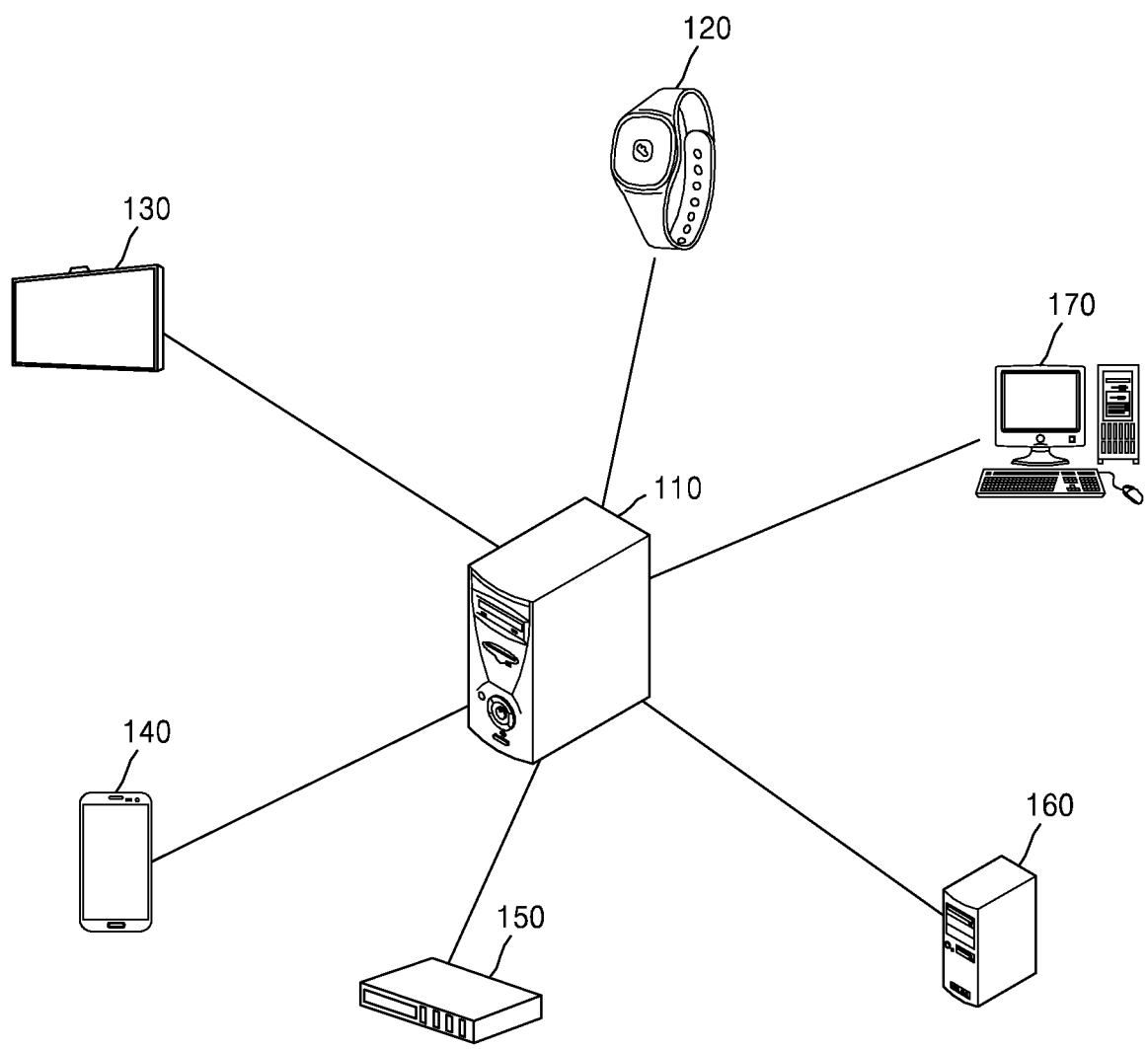
FIG. 1 illustrates an example of a system comprising an electronic device according to certain embodiments of this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the FIG.s, to explain aspects. As used herein, the term "and/or" includes any and all combinations of one or more of the associated listed items. Expressions such as "at least one of," when preceding a list of elements, modify the entire list of elements and do not modify the individual elements of the list.

In the present disclosure, when a configuration is referred to as being "connected" with another configuration, it includes not only a case of being directly connected, but also a case of being connected with another configuration in between. Also, when an element is referred to as "including" another element, it is to be understood that the element may include other elements as well as other elements.

In the present disclosure, the term "de-identification" encompasses processes by which an identifier is removed from data to make it difficult or impossible to identify an individual based on the data.

In the present disclosure, the term "dynamic biometric data" encompasses data relating to a movement of a user who may identify a specific user, and refers to data about a movement of at least a part of a body, a gait, a specific operation, etc.

FIG. 1 illustrates an example of a system comprising an electronic device according to certain embodiments of this disclosure.

Referring to FIG. 1, the system using the electronic device according to certain embodiments of this disclosure may include a server 110 and devices 120, 130, 140, 150, 160, and 170 connected to the server 110.

In some embodiments, the server 110 provides services to at least some of the devices 120, 130, 140, 150, 160, and 170 connected to the server 110. In an embodiment, the server 110 may receive dynamic biometric data of a user from the at least some of the electronic devices 120, 130, 140, 150, 160, and 170 connected to the server 110 and provide a service displaying a movement of the user based on the received dynamic biometric data. At this time, the dynamic biometric data of the user received by the server 110 may be dynamic biometric data distorted and de-identified in the at least some of the electronic devices 120, 130, 140, 150, 160, and 170 connected to the server 110. When the dynamic biometric data of the user received by the server 110 is de-identified dynamic biometric data, the server 110 provides a service displaying a distorted movement of the user.

According to certain embodiments of the present disclosure, the server 110 receives dynamic biometric data regarding the movement of the user and distorts and de-identifies the dynamic biometric data received by the server 110. At this time, the dynamic biometric data received by the server 110 may be already distorted and de-identified dynamic biometric data. In this case, the dynamic biometric data may be distorted once by at least one of the electronic devices 120, 130, 140, 150, 160, and 170 connected to the server 110 and once again distorted in the server 110. Thereafter, the server 110 may provide the service displaying the distorted movement of the user based on the de-identified dynamic biometric data.

An example of the service provided by the server 110 according to certain embodiments of the present disclosure will be described with reference to FIG. 2.

Figure 2:
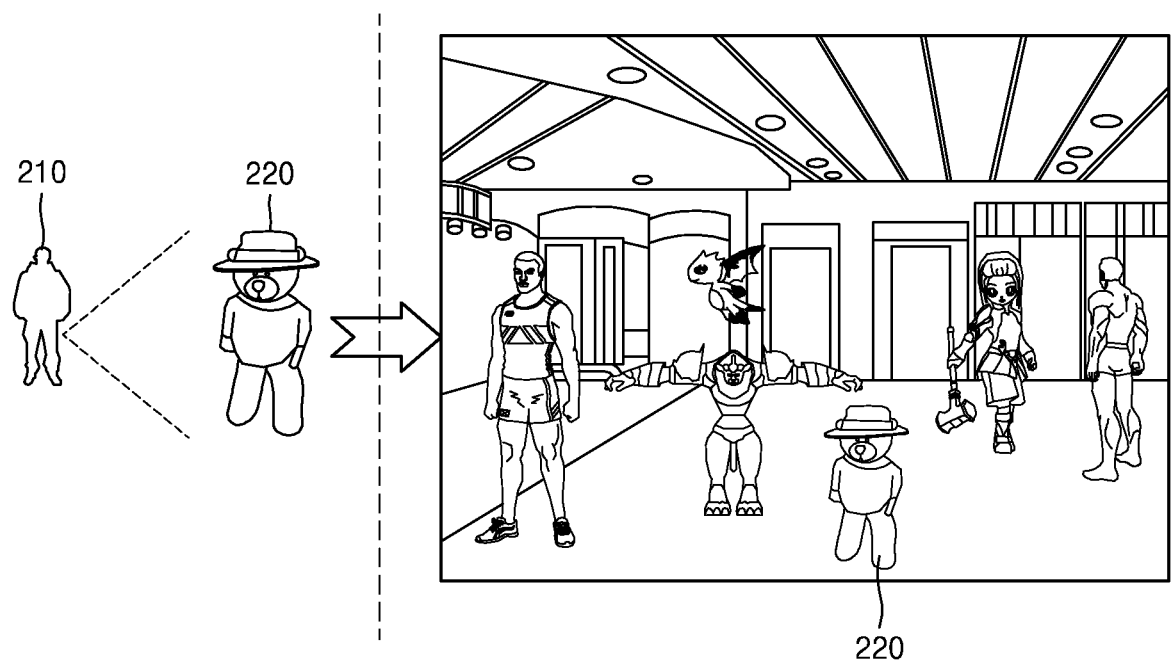
FIG. 2 illustrates a service provided by a server according to certain embodiments of this disclosure, including without limitation, the server shown in the system of FIG. 1.

FIG. 2 is a diagram showing a non-limiting example of a service provided by the server 110 in a system of FIG. 1.

According to certain embodiments of the present disclosure, the service shown in FIG. 2 is a service in which a plurality of users interact with each other using an avatar in a virtual environment 230. For example, the service may be a service such as a chat in a virtual reality or an augmented reality.

Referring to FIG. 2, according to certain embodiments of the present disclosure, an avatar 220 acting according to a movement of a user 210 is displayed. An action of the avatar 220 reflects the movement of the user 210.

In at least one embodiment, the server 110 receives dynamic biometric data that is distorted and de-identified or distorts or de-identifies the received dynamic biometric data, and provides the service based on the de-identified dynamic biometric data. More specifically, the server 110 may provide the service displaying a distorted movement of the user 210 based on the de-identified dynamic biometric data.

In the illustrative example of FIG. 2, the distorted movement of the user 210 is displayed in the virtual environment 230, not the actual, undistorted movement of the user 210. Accordingly, users participating in the service provided by the server 110 see the avatar 220 acting according to the distorted movement of the user 210, not an actual movement of the user 210.

According to certain embodiments, avatar 220 acting according to the distorted movement of the user 210 may be displayed to other users, thereby preventing biometrics of the user 210 from being exposed regardless of user 210's permission or intention. Since dynamic biometrics may be a means identifying or authenticating a user, personal information may be protected by preventing biometrics of the user from being exposed.

Referring back to FIG. 1, the electronic devices 120, 130, 140, 150, 160 and 170 connected to the server 110 may include terminals (mobile phones, tablets, notebooks, personal computers, etc.), servers (cloud servers, private servers, etc.) The electronic devices 120, 130, 140, 150, 160, and 170 connected to the server 110 may further include devices acquiring dynamic biometric data regarding the movement of the user, devices distorting and de-identifying the dynamic biometric data, and devices receiving a service from the server 110. Also, in some embodiments, the devices 120, 130, 140, 150, 160, and 170 connected to the server 110 may include devices including at least one function among a function of acquiring dynamic biometric data regarding the movement of the user, a function of distorting and de-identifying the acquired dynamic biometric data, and a function of receiving a service.

According to certain embodiments of this disclosure, a wearable device 120, such as a smart watch or a head-mounted display, acquires the dynamic biometric data and transmits the dynamic biometric data to the server 110. In an embodiment, the wearable device 120 may capture and detect the movement of the user using a camera, a sensor, or the like. The wearable device 120 may transmit collected data directly to the server 110 or may transmit the collected data through another device that supports de-identification. Further, the wearable device 120 may de-identify the obtained dynamic biometric data and transmit the de-identified obtained dynamic biometric data to the server 110.

According to certain embodiments, terminal devices such as a smart television (TV) 130 or smart phone 140 may acquire the dynamic biometric data and distort and de-identify the acquired dynamic biometric data. Such a terminal device transmits the de-identified dynamic biometric data to the server 110. In at least one embodiment, the terminal device may directly capture and detect the movement of the user by using a camera, a sensor, or the like included in the corresponding device or may receive the dynamic biometric data of the user from another dynamic biometric data acquisition device such as the wearable device 120. Further, the terminal device may directly transmit the acquired dynamic biometric data to the server 110 without de-identifying the dynamic biometric data.

According to certain embodiments, a dynamic biometric data processing device 150 is a device dedicated to acquisition and/or de-identification of the dynamic biometric data. The dynamic biometric data processing device 150 may directly capture and detect the movement of the user by using a camera, a sensor, or the like included in the device, or may receive the dynamic biometric data of the user from the other dynamic biometric data acquisition device, such as the wearable device 120. Further, the dynamic biometric data processing device 150 may de-identify collected dynamic biometric data and transmit the de-identified dynamic biometric data processing device 150 to the server 110 or may directly transmit the dynamic biometric data to the server 110 without de-identifying the dynamic biometric data.

In some embodiments according to this disclosure, server 110 may receive the dynamic biometric data from another server 160 and may provide a service based on the de-identified dynamic biometric data through the other server 160. Also, the server 110 may be connected to a device 170 receiving the service based on the de-identified dynamic biometric data regardless of collection and de-identification of the dynamic biometric data.

The system shown in FIG. 1 is merely an embodiment and the present disclosure is not limited thereto. Various systems may be configured.

Figure 3:
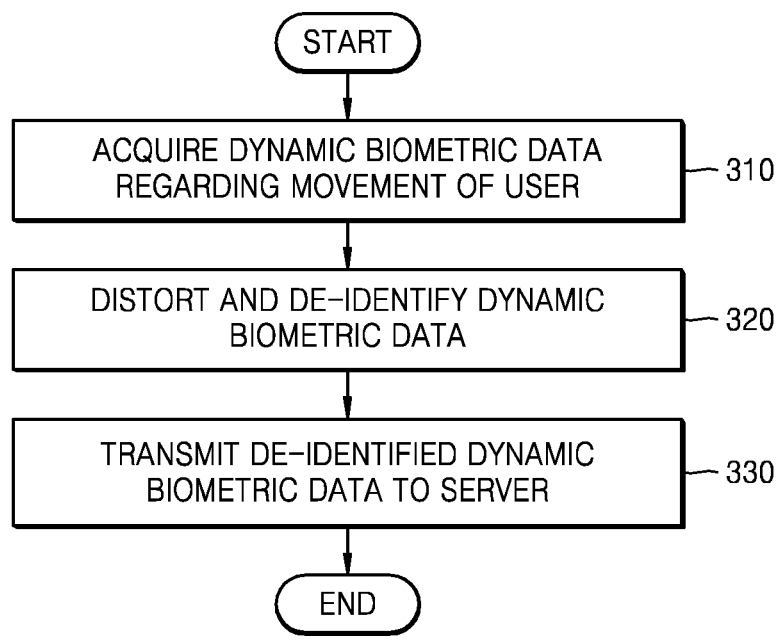
FIG. 3 illustrates, in flowchart format, operations of a method for operating an electronic device, according to certain embodiments of this disclosure.

FIG. 3 illustrates, in flowchart format, operations of a method for operating an electronic device according to certain embodiments of this disclosure.

According to certain embodiments, at operation 310, the electronic device acquires dynamic biometric data regarding a movement of a user. In this non-limiting example, dynamic biometric data refers to data related to the movement of the user who may identify a specific user and refers to biometric data regarding a movement of at least a part of a body, a specific action, and the like. For example, the dynamic biometric data may include facial expressions, hand movements, finger movements, body movements, head movements, leg movements, gait, and the like. In the case of a gait, a step length, a stride length, a stride width, a cadence, a speed, a dynamic base, a progression line, a foot angle, a dynamic base, a hip angle, a squat performance, etc. may be parameters for identifying a specific user.

In at least one embodiment, the electronic device may receive dynamic biometric data obtained from an external device. According to certain embodiments, the electronic device may simply collect the dynamic biometric data, and actual dynamic biometric data may be measured by another device and transmitted to the electronic device. In an embodiment, such an external device may be a wearable device such as a head-mounted display, a smart watch, a smart band, and the like. The wearable device may measure the dynamic biometric data of the user by using a camera, a sensor, and the like included in the device and transmit the measured dynamic biometric data to the electronic device. In at least one embodiment, such an external device may operate separately from the electronic device, and may operate in conjunction with the electronic device.

According to certain embodiments, the electronic device may include a dynamic biometric data acquisition device, such as a camera, a sensor, etc., and may directly measure and obtain the dynamic biometric data. For example, the electronic device may capture the movement of the user by using a camera and obtain the dynamic biometric data. Also, the electronic device may use a sensor such as a gyro sensor, a GPS sensor, or the like to sense the movement of the user and acquire the dynamic biometric data.

Figure 4:
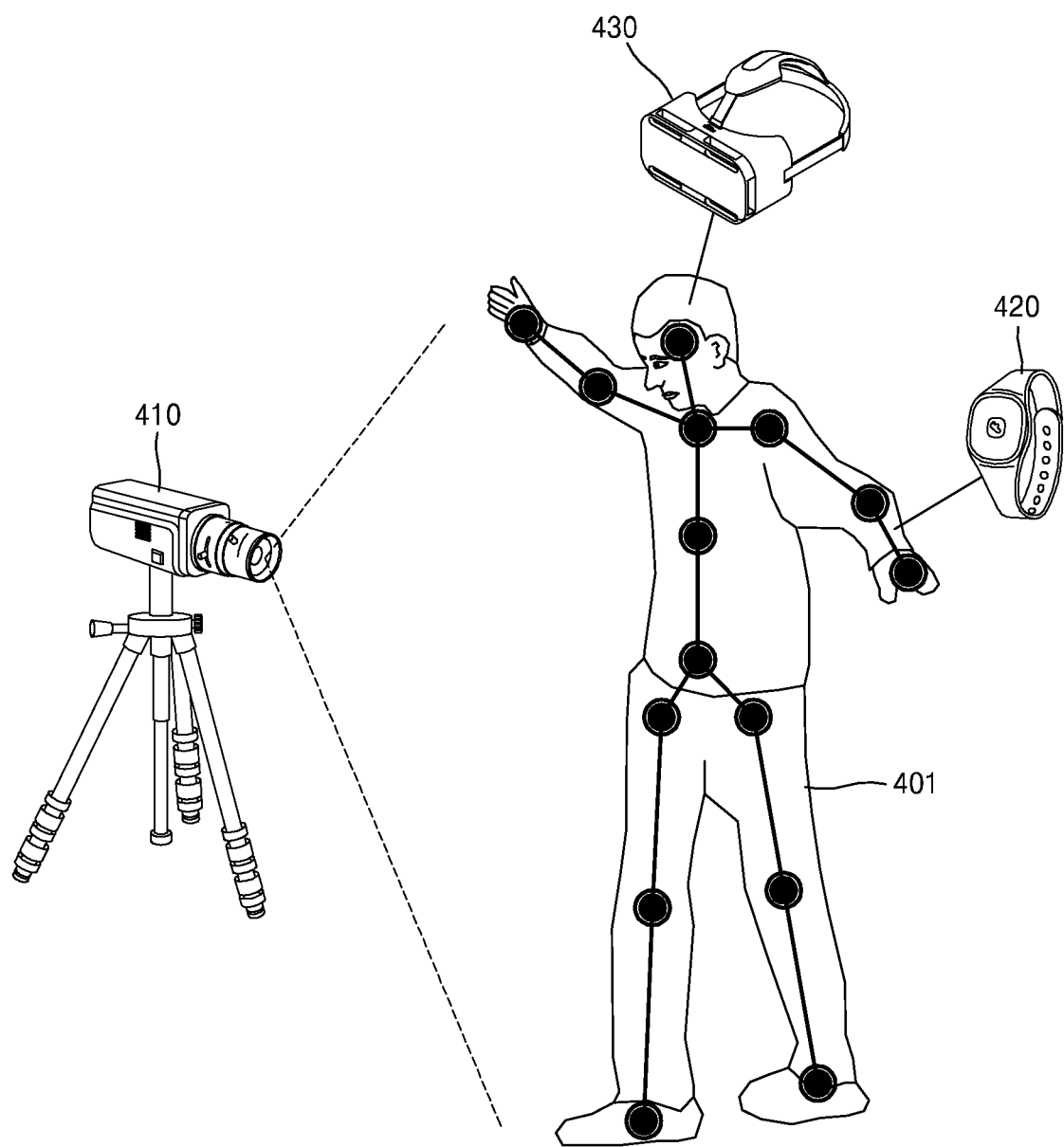
FIG. 4 illustrate aspects of a method of acquiring dynamic biometric data, according to certain embodiments of this disclosure.

Referring to FIGS. 4 and 5, which illustrate aspects of a method of acquiring dynamic biometric data, a process of acquiring the dynamic biometric data will be described.

Referring to FIG. 4, an electronic device may, according to certain embodiments, acquire the dynamic biometric data of a user 401 by using a camera 410 and wearable devices 420 and 430.

In at least one embodiment, the electronic device may capture a movement of the user 401 via camera 410. Although only one camera is shown in the non-limiting example of FIG. 4, two or more cameras may be arranged at various positions to acquire the dynamic biometric data of the user 401.

According to certain embodiments of this disclosure, the electronic device may use wearable devices 420 and 430 to sense the movement of the user 401 and obtain the dynamic biometric data. Although FIG. 4 illustrates the smart watch 420 and the head-mounted display 430 as the wearable devices 420 and 430, this is merely an example and is not limited thereto. For example, various wearable devices may be used to acquire the dynamic biometric data of the user 401. For example, the dynamic biometric data of the user 401 may be obtained using smart clothes.

Further, although not shown in FIG. 4, the dynamic biometric data of the user 401 may, in some embodiments, be acquired using another device. For example, a movement sensing radar module may be used to sense the movement of the user 401 and acquire the dynamic biometric data.

Figure 5A:
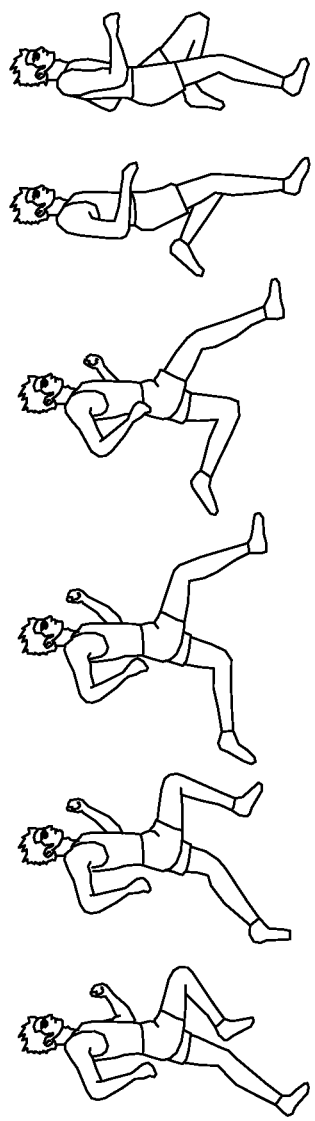
FIGS. 5A and 5B illustrates aspects of a method of acquiring dynamic biometric data, according to certain embodiments of this disclosure.
Figure 5B:
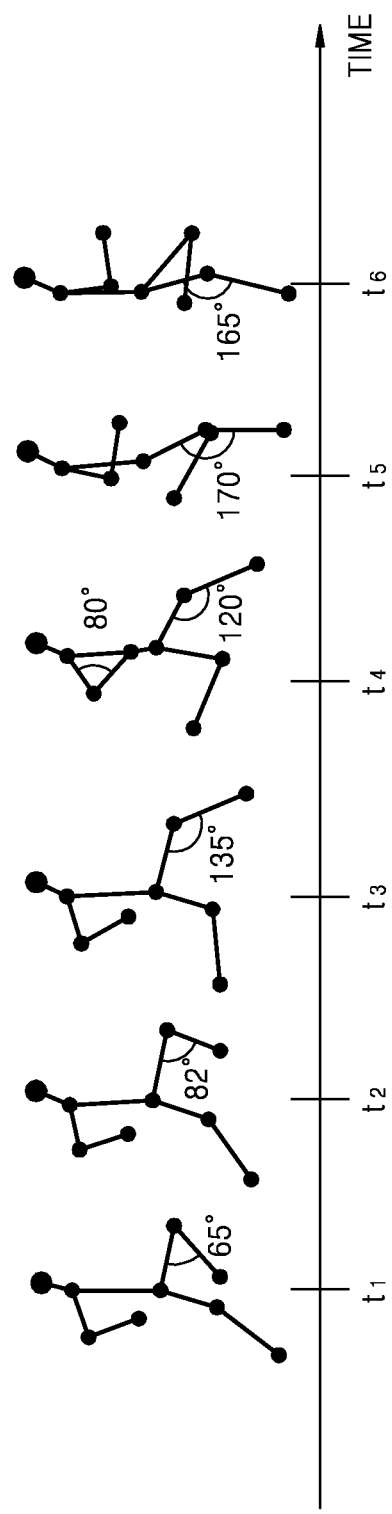

FIGS. 5A and 5B illustrate aspects of a method of acquiring dynamic biometric data according to embodiments of this disclosure.

FIG. 5A diagrammatically illustrates an example of the actual movement of a user captured over time. As described above, an electronic device may acquire the dynamic biometric data of the user by capturing or sensing the movement of the user by using a camera, a wearable device, or the like.

FIG. 5B illustrates an image obtained by skeleton modeling of the movement of the user based on the acquired dynamic biometric data of the user, according to certain embodiments. Referring to FIG. 5B, actual right knee angles of the user may be acquired corresponding to each of time points t1, t2, t3, t4, t5, and t6. Further, various pieces of dynamic biometric data may be acquired without being limited thereto. For example, an angle of a right elbow may be obtained as shown in the skeleton marked $t_4$ FIG. 5B.

Returning to FIG. 3, according to certain embodiments, in operation 320, the electronic device distorts and de-identifies the dynamic biometric data. According to embodiments as described herein, de-identification encompasses operations where an identifier is removed from data to make it difficult or impossible to identify an individual based on the data.

In at least one embodiment, an electronic device modifies a value of the dynamic biometric data to distort the data. At this time, the electronic device may modify a value of the dynamic biometric data according to time. A process of distorting and de-identifying the dynamic biometric data will be described with reference to FIGS. 6A and 6B.

Figures 6A, 6B:
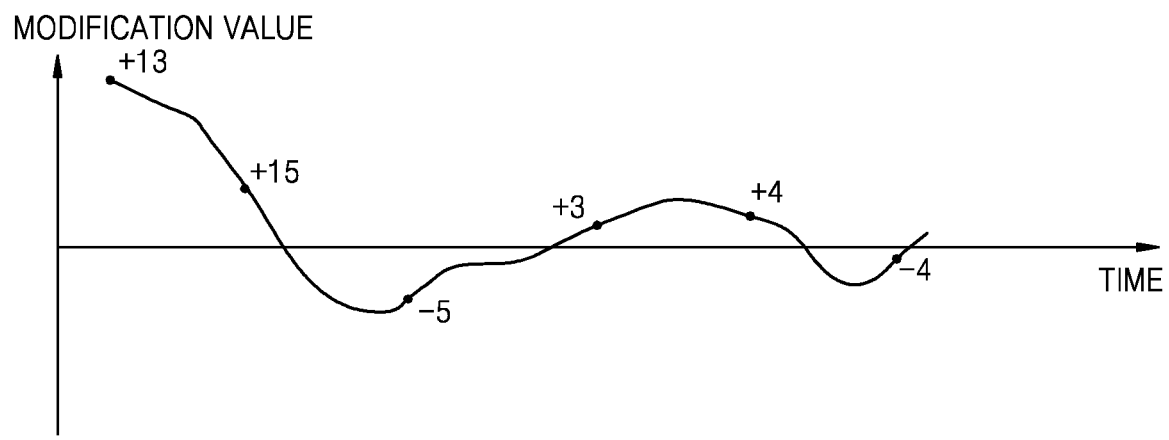
FIGS. 6A and 6B illustrate a table and a graph showing aspects of de-identification of dynamic biometric data over time, according to certain embodiments of this disclosure.

FIGS. 6A and 6B illustrate a table and a graph showing aspects of a process for de-identification of data of a user, such as the data shown as being obtained in FIGS. 5A and 5B according to certain embodiments of this disclosure.

Referring to FIGS. 6A and 6B, in at least one embodiment, a degree of modification to the recorded values of joint angles may be varied for each of the time points t1, t2, t3, t4, t5 and t6. For example, at t1, a right knee angle was modified by +13 degrees, whereas at t3, the right knee angle was modified by −5 degrees.

According to certain embodiments, the extent of de-identification may be increased by varying the degree value of modification of the dynamic biometric data. More specifically, it is difficult to identify a user by modifying the dynamic biometric data irregularly, rather than modifying the dynamic biometric data according to a certain rule.

In FIG. 6, variation of a degree value of modification of the dynamic biometric data over time is described as a non-limiting and illustrative example. It is also possible to vary the degree of modification of the dynamic biometric data based on other parameters. For example, it is possible to generate a dynamic biometric data modification function and vary the degree of modification of the dynamic biometric data according to the generated function.

Figure 7:
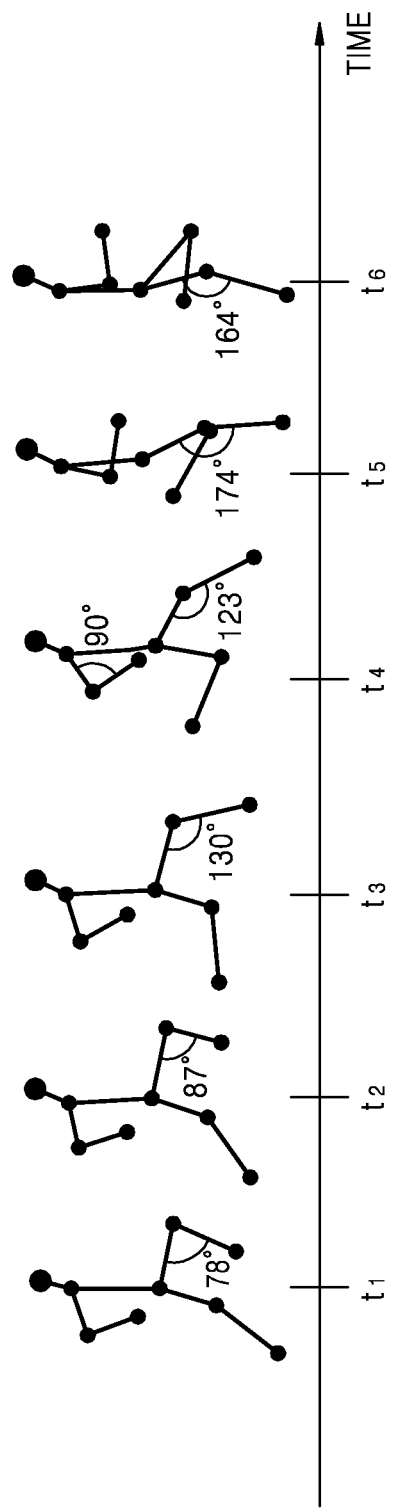
FIG. 7 illustrates modeling a movement of a user based on de-identified dynamic biometric data according to certain embodiments of this disclosure.

FIG. 7 illustrates modeling a movement of a user based on de-identified dynamic biometric data according to certain embodiments of this disclosure.

Referring to FIG. 7, in this non-limiting example, dynamic biometric data shown in FIG. 5B is modified according to a table and a graph shown in FIG. 6. For example, in the dynamic biometric data shown in FIG. 5B, a right knee angle at the time t1 is 65°, whereas a right knee angle at the time t1 in the de-identified biometric data shown in FIG. 7 is 78°.

According to certain embodiments, unique identifiers which identify a user in a de-identifying process may be distorted, and thus other users may not identify the user based only on the movement.

However, the de-identifying process shown in FIGS. 5 through 7 is merely an illustrative example, and the present disclosure is not limited thereto and may be variously applied. For example, de-identification may be performed on parameters other than the knee angle, a degree of data modification may be varied, and other types of dynamic biometric data may be modified.

Returning to the description of FIG. 3, in certain embodiments, the electronic device may not identify the user when reconstructing the movement based on the de-identified dynamic biometric data but may instead modify the value of the dynamic biometric data to such an extent that the movement appears unnatural. In certain embodiments, the electronic device may modify the value of the dynamic biometric data to a value greater than an error rate of an operation of acquiring the dynamic biometric data. Also, when reconstructing the movement of the user based on the de-identified dynamic biometric data, the value of the dynamic biometric data may be modified to maintain continuity in the reconstructed movement of the user. Furthermore, the electronic device may, according to some embodiments, adjust a degree of de-identification of the dynamic biometric data by adjusting a degree of modification of the dynamic biometric data. This will be described with reference to FIG. 8.

Figure 8:
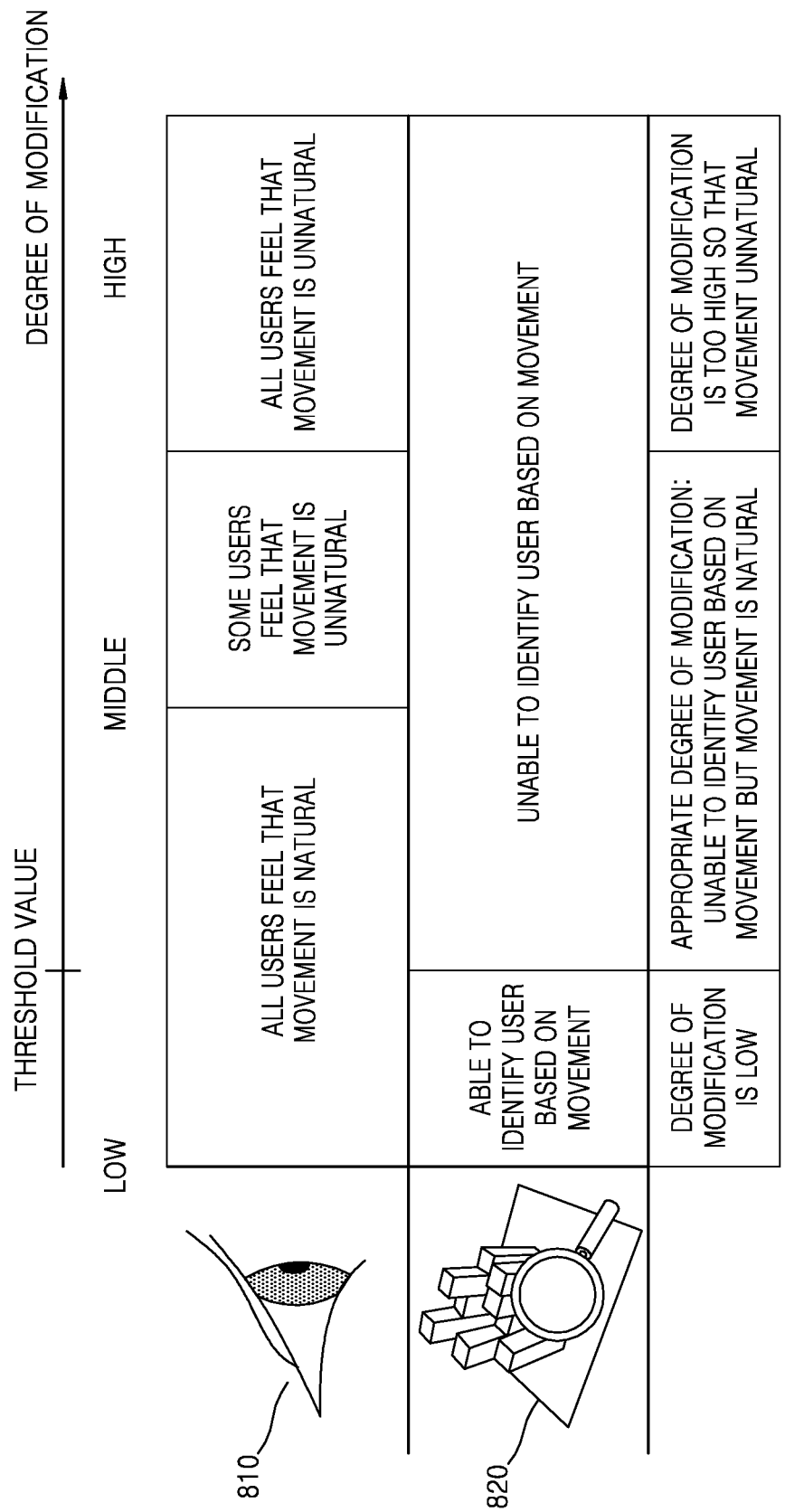
FIG. 8 illustrates aspects of a method of selecting a degree of modification of dynamic biometric data, according to certain embodiments of this disclosure.

FIG. 8 illustrates aspects of a method of selecting a degree of modification of dynamic biometric data, according to certain embodiments of this disclosure.

As described above, an electronic device may adjust the degree of modification of the dynamic biometric data differently.

Referring to FIG. 8, when seen in the naked eye (810), if the degree of modification of the dynamic biometric data is high, other users may perceive that a reconstructed movement appears unnatural based on modified dynamic biometric data. Also, if the degree of modification of the dynamic biometric data is low, other users may feel that the reconstructed movement appears natural based on the modified dynamic biometric data. Furthermore, when the dynamic biometric data is modified more than a certain level, not all users, but some users may perceive that the based on modified dynamic biometric data appears unnatural based on the modified dynamic biometric data.

Users may perceive that the movement is unnatural if continuity of the movement is poor. Accordingly, when reconstructing the movement of a user based on de-identified dynamic biometric data, the electronic device may modify a value of the dynamic biometric data such that the continuity is maintained in the reconstructed movement of the user.

If other users perceive that the movement is unnatural, users may become aware that the dynamic biometric data has been modified and users' satisfaction with a service may also be lowered. Accordingly, to provide a satisfying user experience, it may be necessary to select an appropriate degree of modification.

According to certain embodiments, when analyzing the movement of the user with a dynamic biometric data analysis tool or the like (820), it can be possible to identify the user based on the movement if the degree of modification is too low, that is, below a threshold value. When acquiring the dynamic biometric data, there may be errors depending on the device used. Within this error range, a particular user may be identified even if a data value changes. Thus, the electronic device may modify the value of the dynamic biometric data to a value greater than the error rate of an operation of acquiring the dynamic biometric data.

As described above, if the degree of modification of the dynamic biometric data is high, it is difficult to identify the user from the reconstructed movement, but the reconstructed movement may appear unnatural, whereas if the degree of modification of the dynamic biometric data is low, the reconstructed movement may appear natural, but a possibility of identifying the user increases. Thus, the electronic device may modify the dynamic biometric data to be able to identify the user from the reconstructed movement, while other users should perceive the movement as natural when viewing the reconstructed movement based on the modified dynamic biometric data.

Returning to the description of the non-limiting example of FIG. 3, in certain embodiments, the electronic device may receive an input from the user as to whether to perform de-identification and may or may not perform de-identification according to the input of the user. More specifically, when the electronic device receives an input from the user to perform de-identification, the electronic device may de-identify the dynamic biometric data of the user. Also, if the electronic device receives an input from the user not to perform de-identification, or if there is no input from the user regarding whether to perform de-identification, the electronic device may transmit the dynamic biometric data the server without de-identifying the dynamic biometric data.

According to certain embodiments of the present disclosure, the electronic device may perform de-identification according to a selection of the user.

Next, in operation 330, the electronic device transmits the de-identified dynamic biometric data to the server. In certain embodiments, the electronic device may provide a service displaying a distorted movement of the user based on the de-identified dynamic biometric data. As described above, such a service may be a service in which a plurality of users interact with each other using avatars in a virtual environment. This will be described with reference to the non-limiting example of FIG. 9.

Figure 9:
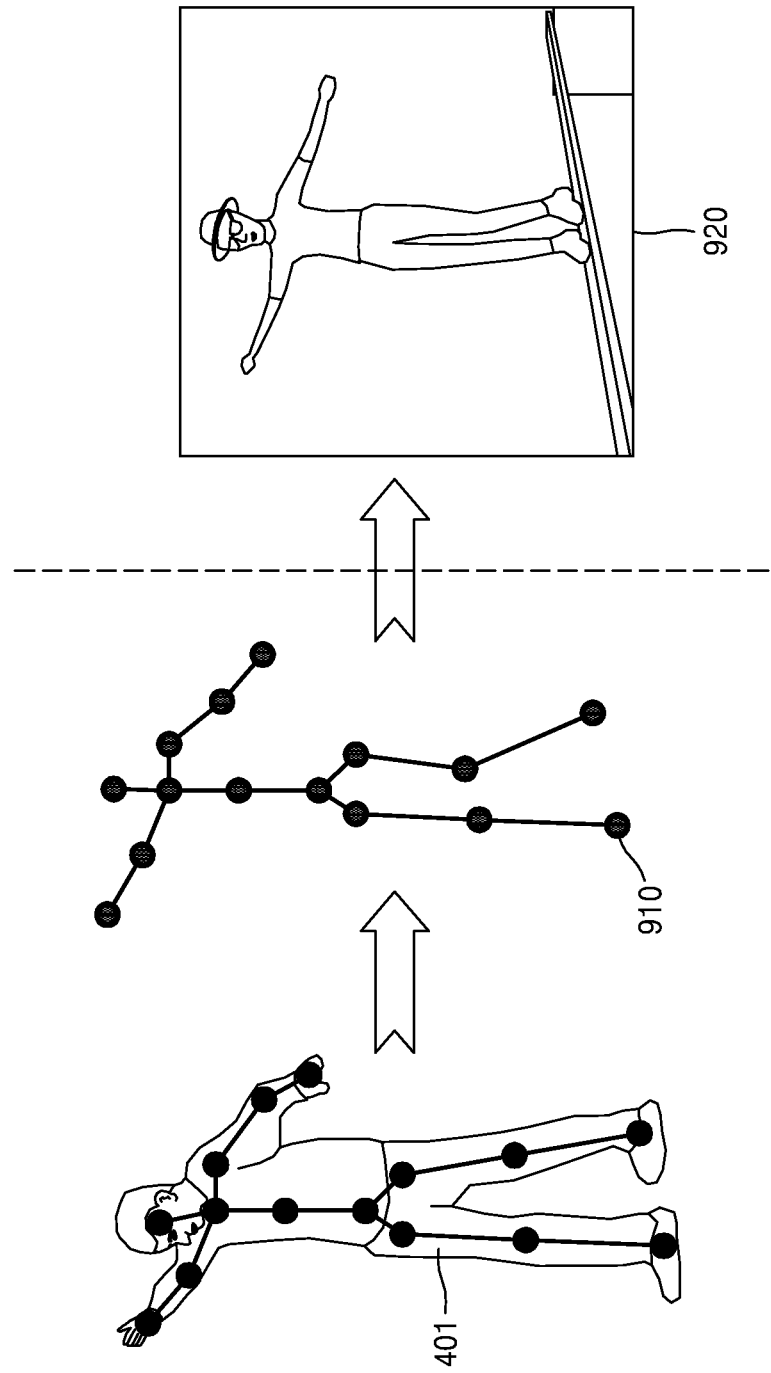
FIG. 9 illustrates aspects of a process of displaying a distorted movement of a user based on de-identified dynamic biometric data, according to certain embodiments of this disclosure.

FIG. 9 illustrates aspects of a process of displaying a distorted movement of a user based on de-identified dynamic biometric data, according to certain embodiments of this disclosure.

According to certain embodiments, an electronic device acquires the dynamic biometric data of the user 401 as shown in FIG. 4. Thereafter, the electronic device distorts and de-identifies the acquired dynamic biometric data. FIG. 9 illustrates an image obtained by de-identifying and modeling the acquired dynamic biometric data. The de-identified dynamic biometric data is transmitted to a server. The server may display (920) an avatar of the user in a virtual environment based on the de-identified dynamic biometric data.

Returning to the description of FIG. 3 again, according to certain embodiments, the server providing the service provides the service using the received dynamic biometric data regardless of whether the received dynamic biometric data is de-identified dynamic biometric data.

Further, in at least one embodiment, the electronic device may modify the dynamic biometric data such that another permitted device may reconstruct de-identified dynamic biometric data. For example, the electronic device may perform de-identification with the other permitted device in a promised manner, or may generate and transmit a key capable of reconstructing de-identification.

According to some embodiments, the permitted device may identify an original movement as is, rather than a modified movement of the user.

Also, in at least one illustrative embodiment, the server may provide an authentication service using the de-identified dynamic biometric data. As described above, the user may select a degree of de-identification and may select whether to perform de-identification according to a user input. The user may select a specific degree of de-identification for a particular operation using the electronic device to de-identify the dynamic biometric data for the operation. Such de-identified dynamic biometric data may be registered in the server as authentication means for a user account. If authentication is required, the user may perform de-identification on the corresponding operation by selecting the degree of de-identification at the time of registration while taking the corresponding operation. Then, user authentication may be performed by transmitting the de-identified dynamic biometric data to the server.

According to some embodiments, the dynamic biometric data used as authentication means is de-identified. Accordingly, even if an action of the user is exposed to other users, contrary to the intentions of the user, the user may not perform user authentication only with the corresponding action, thereby protecting personal information.

Up to now, embodiments of a method of operating an electronic device have been described. Hereinafter, a configuration of the electronic device will be described in more detail.

Figure 10:
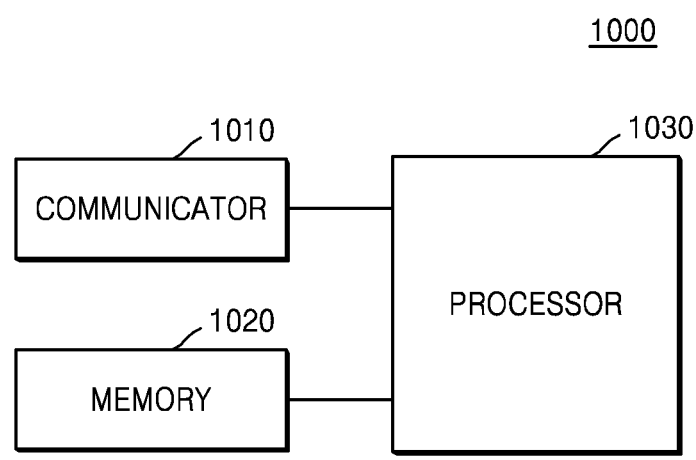
FIG. 10 illustrates, in block diagram format, a configuration of an electronic device according to certain embodiments of this disclosure.

FIG. 10 illustrates, in block diagram format, a configuration of an electronic device 1000 according to certain embodiments of the present disclosure.

Referring to the non-limiting example shown in FIG. 10, an electronic device 1000 according to some embodiments of this disclosure includes a communicator 1010, a memory 1020, and a processor 1030.

The communicator 1010 may perform wired/wireless communication with another device or a network. To this end, the communicator 1010 may include a communication module supporting at least one of various wired/wireless communication methods. For example, the communication module may be in the form of a chipset.

The communicator 1010 may also be connected to an external device located outside the electronic device 1000 and may transmit and receive signals or data. The electronic device 1000 may be connected to the external device through the communicator 1010 and transmit signals or data received from the external device to the processor 1030 or transmit signals or data generated by the processor 1030 to the external device. For example, if the communicator 1010 receives dynamic biometric data from a wearable device or the like, the processor 1030 may de-identify the received dynamic biometric data.

Various types of data such as programs and files, such as applications, may in certain embodiments, be installed and stored in the memory 1020. The processor 1030 may access and use data stored in the memory 1020, or may store new data in the memory 1020. The processor 1030 may also execute a program installed in the memory 1020.

In at least one embodiment, the memory 1020 may store a program for operation of the electronic device 1000.

The processor 1030 may control the overall operation of the electronic device 1000, and in particular, may control a process by which the electronic device 1000 distorts and de-identifies the dynamic biometric data. Also, the processor 1030 may store signals or data input from outside the electronic device 1000 or operate by using a RAM used as a storage area corresponding to various operations performed in the electronic device 1000, a ROM in which a control program for controlling peripheral devices is stored, or the like. The processor 1030 may be implemented as a system on chip (SoC) that integrates a core and a GPU. The processor 1030 may also include a plurality of processors.

According to certain embodiments of this disclosure, the processor 1030 may execute the program stored in the memory 1020 to obtain dynamic biometric data regarding a movement of a user, distort and de-identify the dynamic biometric data, and transmit the de-identified dynamic biometric data to a server. The server may provide a service displaying a distorted movement of the user based on the de-identified dynamic biometric data.

According to certain embodiments of this disclosure, the processor 1030 may modify a value of the dynamic biometric data. The processor 1030 may not identify the user when reconstructing the movement based on the de-identified dynamic biometric data, but may modify the value of the dynamic biometric data to such an extent that the movement is unnatural. Also, the processor 1030 may modify the value of the dynamic biometric data to a value greater than an error rate at the time of acquiring the dynamic biometric data, and when reconstructing the movement based on the de-identified dynamic biometric data, modify the value of the dynamic biometric data such that continuity of the reconstructed movement of the user is maintained. Further, the processor 1030 may modify the value of the biometric data differently over time.

The electronic device 1000 may include additional configurations in addition to those shown in the non-limiting example of FIG. 10. These will be described with reference to FIG. 11.

Figure 11:
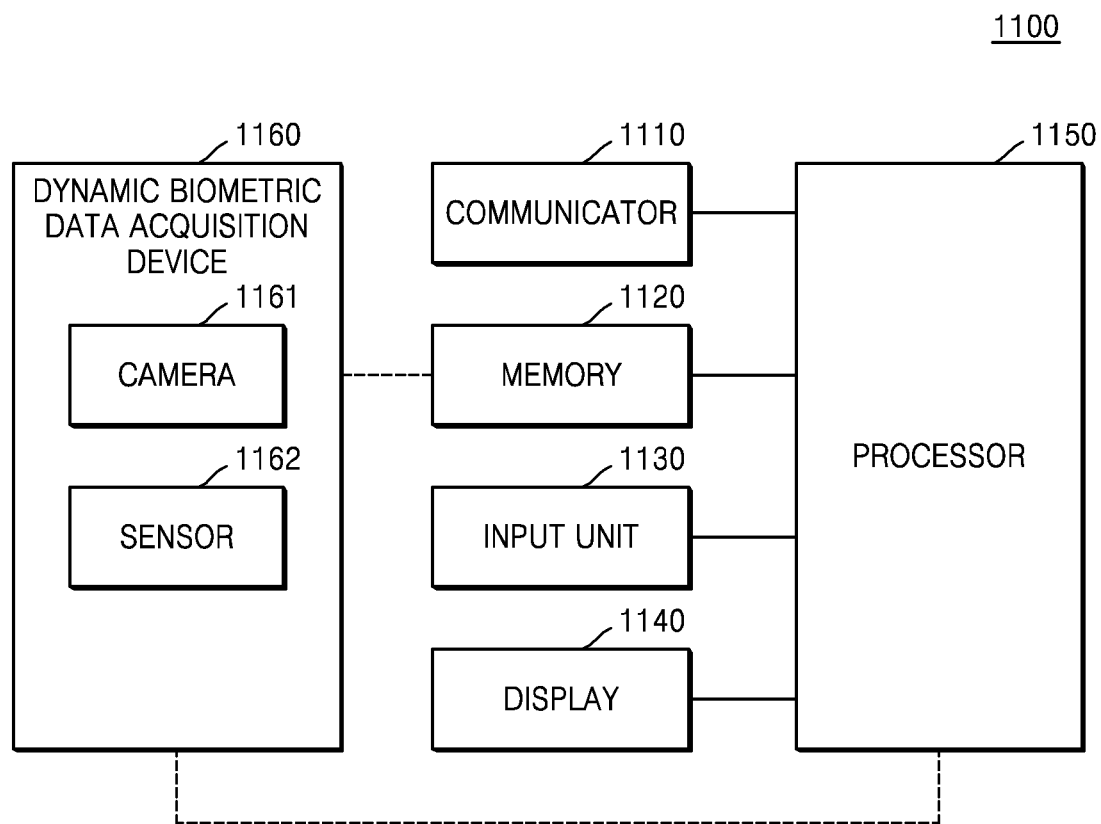
FIG. 11 illustrates, in block diagram format, a configuration of an electronic device according to certain embodiments of this disclosure.

FIG. 11 illustrates, in block diagram format, a configuration of an electronic device 1100 according to certain embodiments of the present disclosure.

Referring to FIG. 11, the electronic device 1100 includes a communicator 1110, a memory 1120, an input unit 1130, and a processor 1140. A dynamic biometric data acquisition device 1160 may be an external device connected to the electronic device 1100 or may be included in the electronic device 1100. The communicator 1110, the memory 1120 and the processor 1150 shown in FIG. 11 are, according to certain embodiments, the same configurations as the communicator 1010, the memory 1020 and the processor 1030 shown in FIG. 10 respectively.

The input unit 1130 receives an input from a user. The input unit 1130 may include, for example, devices capable of receiving various types of user input, such as, a keyboard, a physical button, a touch screen, a camera or a microphone but is not limited thereto. The input unit 1130 may include a device that supports various inputs.

In certain embodiments, the input unit 1130 may receive an input from the user as to whether to perform de-identification.

In some embodiments, in addition to operations described in FIG. 10, the processor 1150 may also de-identify dynamic biometric data of the user when receiving an input from the user through the input unit 1130 indicating to perform de-identification. When the processor 1150 receives from the user through the input unit 1130 indicating not to perform de-identification, or if there is no user input as to whether to perform de-identification, the processor 1150 may also transmit the dynamic biometric data to a server without de-identifying the dynamic biometric data.

The dynamic biometric data acquisition device 1160 acquires the dynamic biometric data. In an embodiment, the dynamic biometric data acquisition device 1160 may include a camera 1161. Also, the dynamic biometric data acquisition device 1150 may include a sensor 1162.

In an embodiment, the dynamic biometric data acquisition device 1160 may be an external device connected to the electronic device 1100, or may be included in the electronic device 1100. In an embodiment, when the dynamic biometric data acquisition device 1160 is the external device connected to the electronic device 1100, the processor 1150 may receive the dynamic biometric data acquired by the dynamic biometric data acquisition device 1160 from the dynamic biometric data acquisition device 1160. When the dynamic biometric data acquisition device 1160 is included in the electronic device 1100, the processor 1150 may directly acquire the dynamic biometric data through the dynamic biometric data acquisition device 1160. More specifically, the processor 1150 may capture a movement of the user through the camera 1151. Also, the processor 1150 may sense the movement of the user through the sensor 1162.

The electronic device 1100 may, in some embodiments further include other components that are not shown in FIGS. 10 and 11. For example, the electronic device 1100 may further include a display and receive a service from the server to display a distorted movement of the user.

The electronic devices 1000 and 1100 and the operation method thereof have been described in the case where de-identification of dynamic biometric data is performed in the electronic devices 1000 and 1100. A server and an operation method when de-identification of dynamic biometric data is performed in the server, according to certain embodiments, will be described below. The contents redundant with those described above will be briefly described.

Figure 12:
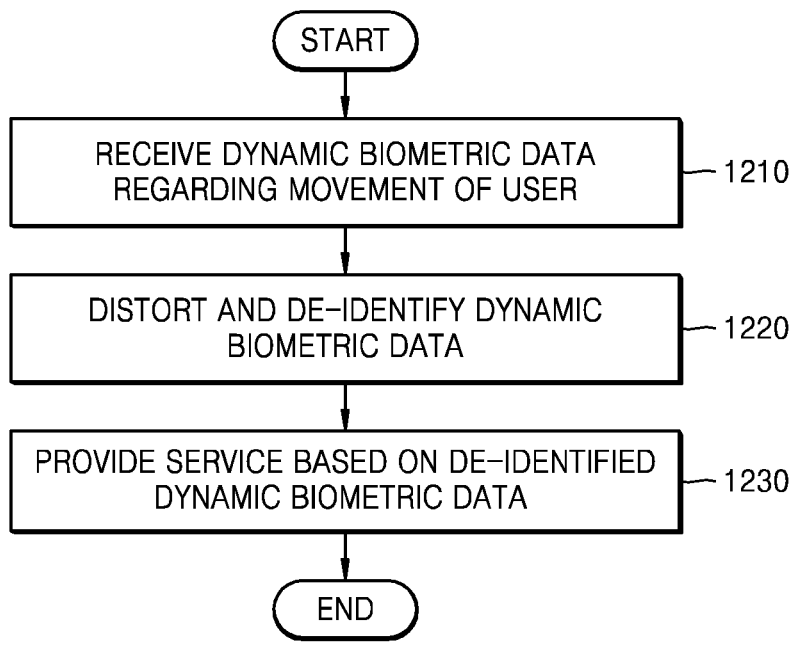
FIG. 12 illustrates, in flowchart format, operations of a method of operating a server, according to certain embodiments of this disclosure.

FIG. 12 illustrates, in flowchart format, operations of a method of operating a server according to certain embodiments of this disclosure.

In the non-limiting example of FIG. 12, at operation 1210, the server receives dynamic biometric data regarding a movement of a user.

Thereafter, at operation 1220, the server distorts and de-identifies the dynamic biometric data. In some embodiments, the server may modify a value of the dynamic biometric data. The server may not identify the user when reconstructing the movement based on the de-identified dynamic biometric data, but may modify the value of the dynamic biometric data to such an extent that the movement is unnatural. Also, the server may modify the value of the dynamic biometric data to a value greater than an error rate at the time of acquiring the dynamic biometric data, and when reconstructing the movement based on the de-identified dynamic biometric data, modify the value of the dynamic biometric data such that continuity of the reconstructed movement of the user is maintained. Further, the server may modify the value of the dynamic biometric data over time.

Further, at operation 1230, the server provides a service based on the de-identified dynamic biometric data. The server may provide the service displaying the distorted movement of the user based on the de-identified dynamic biometric data.

Figure 13:
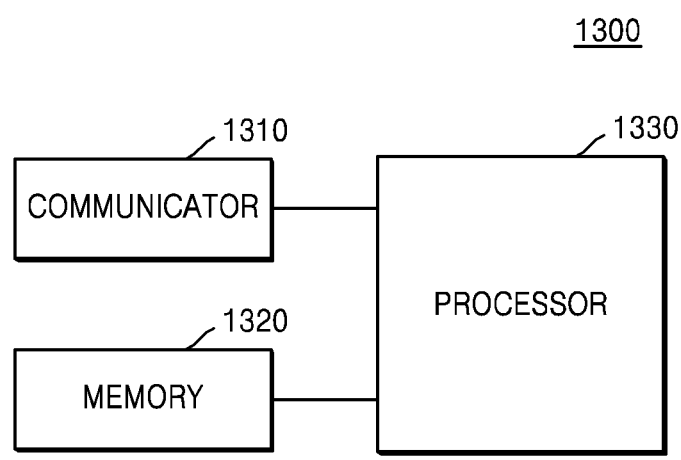
FIG. 13 illustrates, in block diagram format, a configuration of a server according to certain embodiments of this disclosure.

FIG. 13 illustrates, in block diagram format, a configuration of a server 1300 according to certain embodiments of the present disclosure.

Referring to the non-limiting example of FIG. 13, the server 1300 includes a communicator 1310, a memory 1320, and a processor 1330.

The communicator 1310 may, according to various embodiments, perform wired/wireless communication with another device or a network. To this end, the communicator 1310 may include a communication module supporting at least one of various wired/wireless communication methods. For example, the communication module may be in the form of a chipset.

The communicator 1310 may be connected to an external device located outside the server 1300 and may transmit and receive signals or data. The server 1300 may be connected to the external device through the communicator 1310 and transmit signals or data received from the external device to the processor 1330 or transmit signals or data generated by the processor 1330 to the external device. For example, when the communicator 1310 receives dynamic biometric data from a wearable device or the like, the processor 1330 may de-identify the received dynamic biometric data.

In some embodiments according to this disclosure, various types of data such as programs and files, including, without limitation, applications, may be installed and stored in the memory 1320. The processor 1330 may access and use data stored in memory 1320, or may store new data in memory 1320. The processor 1330 may also execute a program installed in the memory 1320.

In certain embodiments, the memory 1320 may store a program for operation of an electronic device.

According to some embodiments, processor 1330 may control the overall operation of the server 1300 and in particular, may control a process in which the server 1300 distorts and de-identifies the dynamic biometric data. Also, the server 1300 may store signals or data input from outside the server 1300 or operate by using a RAM used as a storage area corresponding to various jobs performed by the server 1300, and a Rom in which a control program for controlling peripheral devices is stored, or the like. The processor 1330 may be implemented as a system on chip (SoC) that integrates a core and a GPU. The processor 1330 may also include a plurality of processors.

In at least one embodiment, the processor 1330 may execute a program stored in the memory 1320 to obtain dynamic biometric data regarding a movement of a user, distort and de-identify the dynamic biometric data, and provide a service based on the de-identified dynamic biometric data.

In some embodiments, the processor 1330 may modify a value of the dynamic biometric data. The processor 1330 may not identify the user when reconstructing the movement based on the de-identified dynamic biometric data, but may modify the value of the dynamic biometric data to such an extent that the movement is unnatural. Also, the processor 1330 may modify the value of the dynamic biometric data to a value greater than an error rate at the time of acquiring the dynamic biometric data, and when reconstructing the movement of the user based on the de-identified dynamic biometric data, modify the value of the dynamic biometric data value such that continuity of the reconstructed movement of the user is maintained. Further, the processor 1330 may vary the value of the dynamic biometric data over time.

Meanwhile, the above-described embodiments may be embodied in the form of a non-transitory computer-readable recording medium storing computer-executable instructions and data. At least one of the instructions and the data may be stored in the form of a program code, and when executed by a processor, may generate a predetermined program module to perform a predetermined operation.

The non-transitory computer-readable recording medium may mean, for example, a magnetic storage medium such as a hard disk or the like, an optical reading medium such as a CD and a DVD, or the like, and may be a memory included in a server accessible via a network. For example, the non-transitory computer readable recording medium may be an electronic device or a memory of a server. Also, the non-transitory computer readable recording medium may be a memory included in a terminal, a server, or the like connected to an electronic device or a server via a network.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the FIG.s, it will be understood by those of ordinary skill in the art that various changes in form and details may be made therein without departing from the spirit and scope as defined by the following claims.

Although the present disclosure has been described with reference to exemplary embodiments, various changes and modifications may be suggested to one skilled in the art. It is intended that the present disclosure encompass such changes and modifications as fall within the scope of the appended claims.

What is claimed is:

1. A method of operating an electronic device, the method comprising:
   obtaining dynamic biometric data regarding a movement of a user, wherein the movement of the user indicates an identity of the user;
   identifying joint angles of the user that change over a period of time due to the movement of the user;
   modifying the dynamic biometric data of the movement of the user, the modification changes a value of one of the joint angles at certain time intervals for removing an identifier included in the dynamic biometric data and de-identifies the identity of the user by preventing the user from being identified based on the movement, wherein the modified dynamic biometric data is for reconstructing a distorted movement of the user; and
   transmitting the modified dynamic biometric data to a server for providing a service based on the modified dynamic biometric data.

2. The method of claim 1, further comprising reconstructing the distorted movement of the user based on the modified dynamic biometric data.

3. The method of claim 2, wherein the value of the dynamic biometric data is modified such that the reconstructed distorted movement is not unnatural while not able to identify the user.

4. The method of claim 1, wherein the value of the dynamic biometric data is modified to a value greater than an error rate of the obtained dynamic biometric data at a time of obtaining the dynamic biometric data.

5. The method of claim 2, wherein the value of the dynamic biometric data is modified such that a continuity of the reconstructed distorted movement of the user is maintained.

6. The method of claim 1, wherein modifying the value of the dynamic biometric data comprises differently modifying the value of the dynamic biometric data over time.

7. The method of claim 1, further comprising receiving an input from the user as to whether to perform the de-identification,
wherein de-identifying the dynamic biometric data comprises de-identifying the dynamic biometric data of the user when receiving, from the user, an input for de-identifying the dynamic biometric data.

8. The method of claim 7, further comprising transmitting the dynamic biometric data to the server without de-identifying the dynamic biometric data, in response to receiving, from the user, an input for not de-identifying the dynamic biometric data or when there is no user input for de-identifying the dynamic biometric data.

9. The method of claim 1, wherein obtaining the dynamic biometric data regarding the movement of the user comprises receiving, from an external device, the dynamic biometric data obtained by the external device.

10. The method of claim 1, wherein obtaining the dynamic biometric data regarding the movement of the user comprises capturing the movement of the user.

11. The method of claim 1, wherein obtaining the dynamic biometric data regarding the movement of the user comprises sensing the movement of the user.

12. The method of claim 1, further comprises, receiving from the server a service for displaying the movement of the user based on the distorted movement of the user.

13. An electronic device comprising:
a communicator;
a memory configured to store a program for performing an operation of the electronic device; and
a processor configured to:
obtain dynamic biometric data regarding a movement of a user, wherein movement of the user indicates an identity of the user;
identify joint angles of the user that change over a period of time due to the movement of the user;
modify the dynamic biometric data of the movement of the user, the modification changes a value of one of the joint angles at certain time intervals for removing an identifier included in the dynamic biometric data and de-identifies the identity of the user by preventing the user from being identified based on the movement, wherein the modified dynamic biometric data is for reconstructing a distorted movement of the user; and
transmit the modified dynamic biometric data to a server for providing a service based on the modified dynamic biometric data.

14. The electronic device of claim 13, wherein the processor is further configured to reconstruct the distorted movement of the user based on the modified dynamic biometric data.

15. The electronic device of claim 13, further comprising an input unit configured to receive an input from the user as to whether to perform the de-identification,
wherein the processor is further configured to de-identify the dynamic biometric data of the user when receiving, from the user, an input for de-identifying the dynamic biometric data.

16. A method of operating a server, the method comprising:
receiving dynamic biometric data regarding a movement of a user, wherein the movement of the user indicates an identity of the user;
identifying joint angles of the user that change over a period of time due to the movement of the user;
modifying the dynamic biometric data of the movement of the user, the modification changes a value of one of the joint angles at certain time intervals for removing an identifier included in the dynamic biometric data and de-identifies the identity of the user by preventing the user from being identified based on the movement, wherein the modified dynamic biometric data is for reconstructing a distorted movement of the user; and
providing a service based on the modified dynamic biometric data.

17. The method of claim 16, further comprising reconstructing the distorted movement of the user based on the modified dynamic biometric data.

18. The method of claim 16, wherein the service is for displaying the movement of the user based on the modified dynamic biometric data.

19. A server comprising:
a communicator;
a memory configured to store a program for performing an operation of the server; and
a processor configured to:
obtain dynamic biometric data regarding a movement of a user, wherein the movement of the user indicates an identity of the user,
identify joint angles of the user that change over a period of time due to the movement of the user,
modify the dynamic biometric data of the movement of the user, the modification changes a value of one of the joint angles at certain time intervals for removing an identifier included in the dynamic biometric data and de-identifies the identity of the user by preventing the user from being identified based on the movement, wherein the modified dynamic biometric data is for reconstructing a distorted movement of the user, and
provide a service based on the modified dynamic biometric data.

20. The server of claim 19, wherein the processor is further configured to reconstruct the distorted movement of the user based on the modified dynamic biometric data.

* * * * *